United States Patent
Sexton

(10) Patent No.: US 6,769,116 B1
(45) Date of Patent: Jul. 27, 2004

(54) DIAGNOSTIC TECHNIQUE FOR DEBUGGING MEMORY CORRUPTION

(75) Inventor: Harlan Sexton, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 495 days.

(21) Appl. No.: 09/584,085

(22) Filed: May 31, 2000

Related U.S. Application Data

(60) Provisional application No. 60/186,197, filed on Mar. 1, 2000, provisional application No. 60/185,135, filed on Feb. 25, 2000, provisional application No. 60/185,137, filed on Feb. 25, 2000, provisional application No. 60/185,134, filed on Feb. 25, 2000, provisional application No. 60/185,138, filed on Feb. 25, 2000, provisional application No. 60/185,139, filed on Feb. 25, 2000, provisional application No. 60/185,136, filed on Feb. 25, 2000, and provisional application No. 60/160,759, filed on Oct. 21, 1999.

(51) Int. Cl.[7] .................................................. G06F 9/44
(52) U.S. Cl. ....................... 717/130; 717/129; 714/35; 712/227; 712/244
(58) Field of Search ........................ 717/130, 127–131, 717/124; 714/35; 712/227, 244

(56) References Cited

U.S. PATENT DOCUMENTS

| | | | | |
|---|---|---|---|---|
| 5,093,914 A | * | 3/1992 | Coplien et al. .............. 717/129 |
| 5,669,000 A | * | 9/1997 | Jessen et al. ................ 717/127 |
| 5,896,536 A | * | 4/1999 | Lindsey ....................... 717/128 |
| 5,907,709 A | * | 5/1999 | Cantey ......................... 717/141 |
| 5,966,541 A | * | 10/1999 | Agarwal ...................... 717/132 |
| 6,085,029 A | * | 7/2000 | Kolawa et al. ............... 714/38 |
| 6,240,545 B1 | * | 5/2001 | Carmichael et al. ......... 717/128 |

OTHER PUBLICATIONS

Tristan Gingold, Checker, A memory access detector, 1998 [retrieved Nov. 25, 2002]. Retrieved from the internet: <see URL below this entry>.*
URL for above enry http://216.239.51.100/search?q=cache:U3uukMsr_KoC:www.lifl.fr/PRIVATE/Manuals/gnulang/checker/checker/checker_toc.htm 1+%22a+memory+access+detector%22+and+checker&hl=en&ie=UTF-8.*

* cited by examiner

Primary Examiner—Antony Nguyen-Ba
(74) Attorney, Agent, or Firm—Ditthavong & Carlson, P.C.

(57) ABSTRACT

Memory management routines for a program are instrumented to check if the address of an object they are handling is equal to the value of a predetermined pointer. If the address of the object equals the value of the global pointer, then a debugging routine is called. In a debugger, a breakpoint is placed on the debugging routine, and the program is run until the breakpoint is tripped. At this or one of the later breakpoints, the corrupted memory address is repeatedly inspected until the operation that caused the corruption is executed.

10 Claims, 2 Drawing Sheets

DIAGNOSTIC TECHNIQUE FOR DEBUGGING MEMORY CORRUPTION

RELATED APPLICATIONS

The present application claims the benefit of the following U.S. Provisional Patent Applications, the contents of all of which are incorporated by reference in their entirety:

U.S. Provisional Patent Application Serial No. 60/160,759 entitled USE OF A JAVA VM INSTANCE AS THE BASIC UNIT OF USER EXECUTION IN A SERVER ENVIRONMENT, filed on Oct. 21, 1999 by Harlan Sexton et al., (docket 50277-325; OID-1997-048-19PRO);

U.S. Provisional Patent Application Serial No. 60/185,136 entitled MEMORY MANAGEMENT USING MIGRATION FOR A RUN-TIME ENVIRONMENT, filed on Feb. 25, 2000 by Harlan Sexton et al., (docket 50277-240; OID-1997-048-06PRO);

U.S. Provisional Patent Application Serial No. 60/185,139 entitled METHOD AND ARTICLE FOR MANAGING REFERENCES BETWEEN OBJECTS IN MEMORIES OF DIFFERENT DURATIONS IN A RUN-TIME ENVIRONMENT, filed on Feb. 25, 2000 by Harlan Sexton, (docket 50277-257; OID-1997-048-13PRO);

U.S. Provisional Patent Application Serial No. 60/185,138 entitled STATIC OBJECT SYSTEM AND METHODOLOGY FOR IMPLEMENTING A RUN-TIME ENVIRONMENT, filed on Feb. 25, 2000 by Harlan Sexton et al. (docket 50277-215; OID-1997-048-09);

U.S. Provisional Patent Application Serial No. 60/185,134 entitled AURORA NATIVE COMPILATION, filed on Feb. 25, 2000 by Dmitry Nizhegorodov (docket 50277-324; OID-1997-048-18PRO);

U.S. Provisional Patent Application Serial No. 60/185,137 entitled ACCESSING SHORTER-DURATION INSTANCES OF ACTIVATABLE OBJECTS BASED ON OBJECT REFERENCES STORED IN LONGER-DURATION MEMORY, filed on Feb. 25, 2000 by Harlan Sexton et al. (docket 50277-327; OID-1999-084-01PRO);

U.S. Provisional Patent Application Serial No. 60/185,135 entitled HANDLING CALLOUTS MADE BY A MULTI-THREADED VIRTUAL MACHINE TO A SINGLE THREADED ENVIRONMENT, filed on Feb. 25, 2000 by Scott Meyer (docket 50277-332; OID-1997-084-02PRO); and U.S. Provisional Patent Application Serial No. 60/186,197 entitled DIAGNOSTIC TECHNIQUE FOR DEBUGGING MEMORY CORRUPTION, filed on Mar. 1, 2000 by Harlan Sexton (docket 50277-323; OID-1997-084-10PRO);

The present application is related to the following commonly-assigned, copending U.S. Patent Applications, the contents of all of which are incorporated by reference in their entirety:

U.S. patent application Ser. No. 09/248,295 entitled MEMORY MANAGEMENT SYSTEM WITHIN A RUN-TIME ENVIRONMENT, filed on Feb. 11, 1999 by Harlan Sexton et al. (docket 50277-178; OID-1997-048-01);

U.S. patent application Ser. No. 09/248,291 entitled MACHINE INDEPENDENT MEMORY MANAGEMENT SYSTEM WITHIN A RUN-TIME ENVIRONMENT, filed on Feb. 11, 1999 by Harlan Sexton et al. (docket 50277-172; OID-1997-048-02);

U.S. patent application Ser. No. 09/248,294 entitled ADDRESS CALCULATION OF INVARIANT REFERENCES WITHIN A RUN-TIME ENVIRONMENT, filed on Feb. 11, 1999 by Harlan Sexton et al. (docket 50277-179; OID-1997-048-03);

U.S. patent application Ser. No. 09/248,297 entitled PAGED MEMORY MANAGEMENT SYSTEM WITHIN A RUN-TIME ENVIRONMENT, filed on Feb. 11, 1999 by Harlan Sexton et al: (docket 50277-261; OID-1997-048-17);

U.S. patent application Ser. No. 09/320,578 entitled METHOD AND ARTICLE FOR ACCESSING SLOTS OF PAGED OBJECTS, filed on May 27, 1999 by Harlan Sexton et al. (docket 50277-293; OID-1998-034-01);

U.S. patent application Ser. No. 09/408,847 entitled METHOD AND ARTICLE FOR MANAGING REFERENCES TO EXTERNAL OBJECTS IN A RUNTIME ENVIRONMENT, filed on Sep. 30, 1999 by Harlan Sexton et al. (docket 50277-230; OID-1997-048-12);

U.S. patent application Ser. No. 09/512,619 entitled METHOD FOR MANAGING MEMORY USING EXPLICIT, LAZY INITALIZATION IN A RUN-TIME ENVIRONMENT, filed on Feb. 25, 2000 by Harlan Sexton et al. (docket 50277-214; OID-1997-048-07);

U.S. patent application Ser. No. 09/512,622 entitled METHOD FOR MANAGING MEMORY USING ACTIVATION-DRIVEN INITIALIZATION IN A RUN-TIME ENVIRONMENT, filed on Feb. 25, 2000 by Harlan Sexton et al. (docket 50277-213; OID-1997-048-08);

U.S. patent application Ser. No. 09/512,621 entitled SYSTEM AND METHODOLOGY FOR SUPPORTING A PLATFORM INDEPENDENT OBJECT FORMAT FOR A RUN-TIME ENVIRONMENT, filed on Feb. 25, 2000 by Harlan Sexton et al. (docket 50277-258; OID-1997-048-14);

U.S. patent application Ser. No. 09/512,618 entitled METHOD AND APPARATUS FOR MANAGING SHARED MEMORY IN A RUN-TIME ENVIRONMENT, filed on Feb. 25, 2000 by Harlan Sexton et al. (docket 50277-259; OID-1997-048-15); and U.S. patent application Ser. No. 09/512,620 entitled USING A VIRTUAL MACHINE INSTANCE AS THE BASIC UNIT OF USER EXECUTION IN A SERVER ENVIRONMENT, filed on Feb. 25, 2000 by Harlan Sexton et al. (docket 50277-403; OID-1997-048-19).

FIELD OF THE INVENTION

The present invention relates to computer systems and more particularly to a diagnostic technique for debugging memory corruption.

BACKGROUND OF THE INVENTION

During execution of a program, objects are allocated memory, which is used to store information. An object is an entity that encapsulates data and, in some languages, operations associated with the object. Since the encapsulated data is stored in memory, objects are associated with particular regions of memory that are allocated and deallocated by the program. In most environments, memory management routines are provided to allow programmers to dynamically allocate and deallocate memory for objects. In some run-time environments, such as in a JAVA™ virtual machine, the memory management routines also provide for garbage collection, which automatically reclaims memory for objects that are no longer used.

Due to programming errors, the memory of an object or other data structure may be unintentionally modified. This type of error is referred to as "memory corruption," and there are many causes for memory corruption, such as overwriting beyond the bounds of an object (into another object), writing to an uninitialized pointer, writing to a pointer that used to point to an object but that had been deallocated, and other misuses of pointers.

Memory corruption is a notoriously difficult and subtle problem to fix. Typically, the effect of the corruption does not manifest until well after the corruption occurred. For example, an object may be allocated in a run-time environment employing garbage collection. This object may contain a reference to another object, typically stored as a machine pointer. If the machine pointer in the object is corrupted due to a programming error, then using the corrupted pointer may result in attempting to access an invalid area of memory, producing a segmentation fault or other operating system fault and generating a core dump. In many cases, the corrupted pointer lies dormant until much later, when the garbage collector inspects pointers contained in the object.

Conventional techniques for identifying the cause of a memory corruption are laborious and cumbersome. Although it is generally possible to ascertain the memory location of the corrupted part of the object by inspecting the core dump, it is difficult to identify which operation actually corrupted the object. Because most memory corruption occurs from misusing pointers, the operation that corrupted the object often bears no apparent relationship to the object.

To debug a memory corruption, a programmer typically establishes the operating conditions, such as the input data, that cause the memory corruption to be consistently reproducible. Inspecting the core dump, the programmer then figures out the memory address of the part of the object that was overwritten and looks for changes to that memory location. Many debuggers provide "watchpoints," which direct the debugger to break execution of a program when a specified memory location changes. Accordingly, the programmer would set a watchpoint on the memory location that was corrupted and inspect every change to that memory location.

Unfortunately, that memory location may be legitimately used for thousands of times from the beginning of the program before becoming corrupted. In fact, that memory location may be used by many different objects before the corrupted object was even allocated, because memory is often reused. As a result, the programmer may be forced to inspect thousands of benign modifications to a particular memory address. Even if the memory address changes relatively few times, using watchpoints is a slow and cumbersome procedure. For example, with software watchpoints, execution of the program is slowed by many orders of magnitude, because the debugger has to step through the program, operation by operation, and check if the specified memory location has changed. Even with hardware watchpoints, the debugging operation by the user is slow, because the user has to check for each modification if the modification is not benign.

Therefore, there is a need for a diagnostic technique that can quickly help the programmer to identify the cause of memory corruption errors.

SUMMARY OF THE INVENTION

This need and others are addressed by the present invention, in which the memory management routines are instrumented (e.g. in a debugging compilation mode) to check if the address of the object they are handling is equal to the value of a predetermined pointer. If the address of the object equals the value of the pointer, then a debugging routine is called. One advantage to calling the debugging routine is that the programmer can set a "breakpoint" on the debugging routine. A breakpoint is facility provided by debuggers that breaks execution of a program when a specified instruction is executed, for example, the first instruction of a function, to allow the programmer inspect the state of the program at that point. Setting a breakpoint and breaking execution of the program when the breakpoint is encountered usually does not affect the speed of the rest of the program in the debugger.

To use these instrumented memory management routines, a programmer ascertains the address of the object that was corrupted, typically by inspecting the core dump, and sets the global pointer to that address. In addition, the programmer sets a breakpoint on the debugging routine and starts execution of the program. All of these operations can be performed in the debugger without having to recompile the program. When the instrumented memory management routines handle an object whose address equals the value of the global pointer, the debugging routine is called, which trips the breakpoint. For example, this event may occur whenever an object is allocated at, deallocated from, or relocated from or to that address. At the last breakpoint before the object is corrupted, the programmer then sets a watchpoint on the corrupted memory address within the object and waits for the corruption to occur. Since a breakpoint rather than a watchpoint is used to pass over working areas of the program (because breakpoints are typically triggered much less often than watchpoints on changes to a watched memory location), execution of the program in the debugger is fast, and much less time is spent in finding the source of memory corruptions.

Accordingly one aspect of the invention relates to a method and software for debugging a memory corruption in a program. An instrumented version of the program is executed with a memory management routine that compares an address of an object handled by the memory management routine and a value of a pointer, and, if the address of the object equals the value of the pointer, calls a debugging function. The methodology also includes setting the pointer to a desired value and setting a breakpoint on the debugging function.

In one embodiment, execution of the instrumented version of the program is broken when the breakpointed debugging function is called, so that a watchpoint may be set on a memory location afflicted with the memory corruption; and execution is continued until the memory location changes.

Another aspect of the invention pertains to a method and software for debugging a memory corruption in a program by: comparing an address of an object handled by a memory management routine of the program and a value of a predetermined pointer; and, if the address of the object equals the value of the predetermined pointer, then calling a debugging function. In one embodiment, the memory management routine may be a memory allocation or a memory deallocation routine.

Yet another aspect of the invention involves a method and software for debugging a memory corruption in a program by instrumenting or conditionally compiling one or more memory management routines of the program to perform the steps of: comparing an address of an object handled by a memory management routine of the program and a value of a pointer; and if the address of the object equals the value of the pointer, then calling a debugging function.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method, apparatus, and software for debugging memory corruption are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
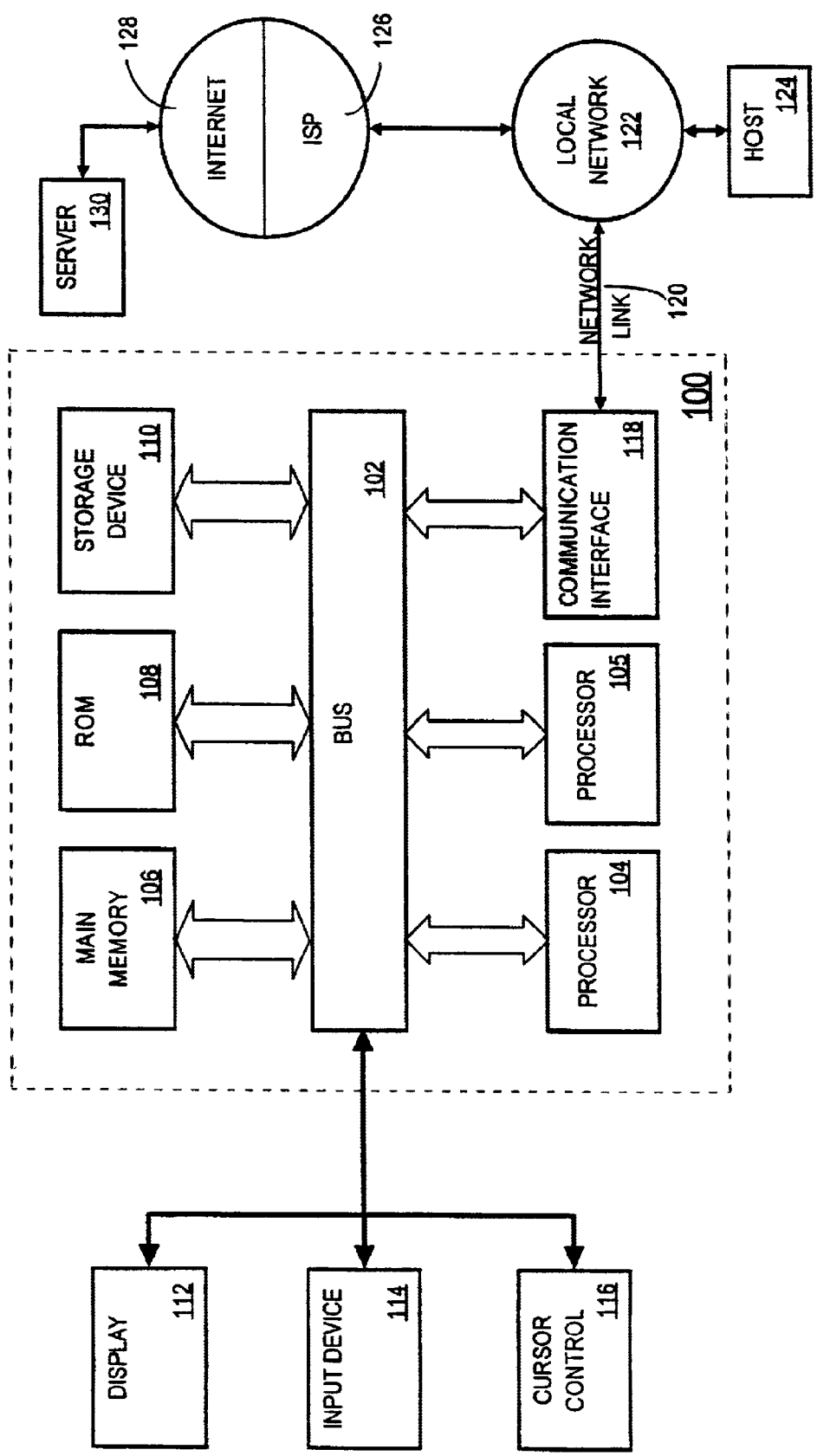
FIG. 1 depicts a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and processors 104 and 105 both coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104 and processor 105. Computer system 100 further includes a read only memory (ROM) 108 or other static storage device coupled to bus 102 for storing static information and instructions for processor 104 and processor 105. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for debugging memory corruption. According to one embodiment of the invention, debugging memory corruption is provided by computer system 100 in response to processor 104 and/or processor 105 executing one or more sequences of one or more instructions contained in main memory 106. Such instructions may be read into main memory 106 from another computer-readable medium, such as storage device 110. Execution of the sequences of instructions contained in main memory 106 causes processor 104 and/or processor 105 to perform the process steps described herein. Although FIG. 1 depicts a dual processing arrangement with processors 104 and 105, one or more processors in a uni-processing or multi-processing arrangement, respectively, may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 and/or processor 105 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described infra, or any other medium from which a computer can read.

Various forms of computer readable media may be involved in carrying one or more sequences of one or more instructions to processor 104 and/or processor 105 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 and/or processor 105 retrieves and executes the instructions. The instructions received by main memory 106 may optionally be stored on storage device 110 either before or after execution by processor 104 and/or processor 105.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for debugging memory corruption as described herein. The received code may be executed by processor 104 as it is received, and/or stored in storage device 110, or other non-volatile storage for later execution. In this manner, computer system 100 may obtain application code in the form of a carrier wave.

"Virtual memory" refers to memory addressable by a storage allocation technique in which auxiliary storage, such as memory in storage device 110, can be addressed as though it were part of the main memory 106. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory 110.

On many operating systems, a process will utilize a certain amount of virtual memory that no other user process may access in order to provide data security. "Shared memory" refers to the virtual address space on the computer system 100 that is concurrently accessible to a plurality of executing user processes on a processor 104. In some embodiments, shared memory is also accessible to executing user processes on a plurality of processors, such as processors 104 and 105.

"Secondary storage" as used herein refers to storage elements, other than virtual memory, accessible to a process. Secondary storage may be local or networked. Local secondary storage, furnished by storage device 100 on computer system 100, is preferably a random access storage device such as a magnetic or optical disk. Networked secondary storage is provided by storage devices on other computer systems, for example on host 124, accessible over a local area network 122, or server 130, accessible over a wide area network such as the Internet.

Debugging Memory Corruption

To support debugging memory corruption, a small amount of instrumentation is added to a program. The instrumentation code, when executed, calls a breakpointable function when a predetermined condition occurs. In a preferred embodiment, this predetermined condition occurs when a memory management routine handles an object having a desired address. Memory management routines includes those routines that handle the memory allocation and deallocation for objects, and, in more sophisticated systems, include garbage collection. For example, garbage collection routines may include routines for relocating objects, migrating objects, and marking objects in a mark-sweep garbage collector. To debug memory corruption, a predetermined pointer is set to the desired address, which is checked in the instrumented memory management routines, and a breakpoint is set on the breakpointable function. Thus, the execution of large portions of the program can be quickly passed over before starting the intensive watchpointing or other memory inspection procedure.

Figure 2:
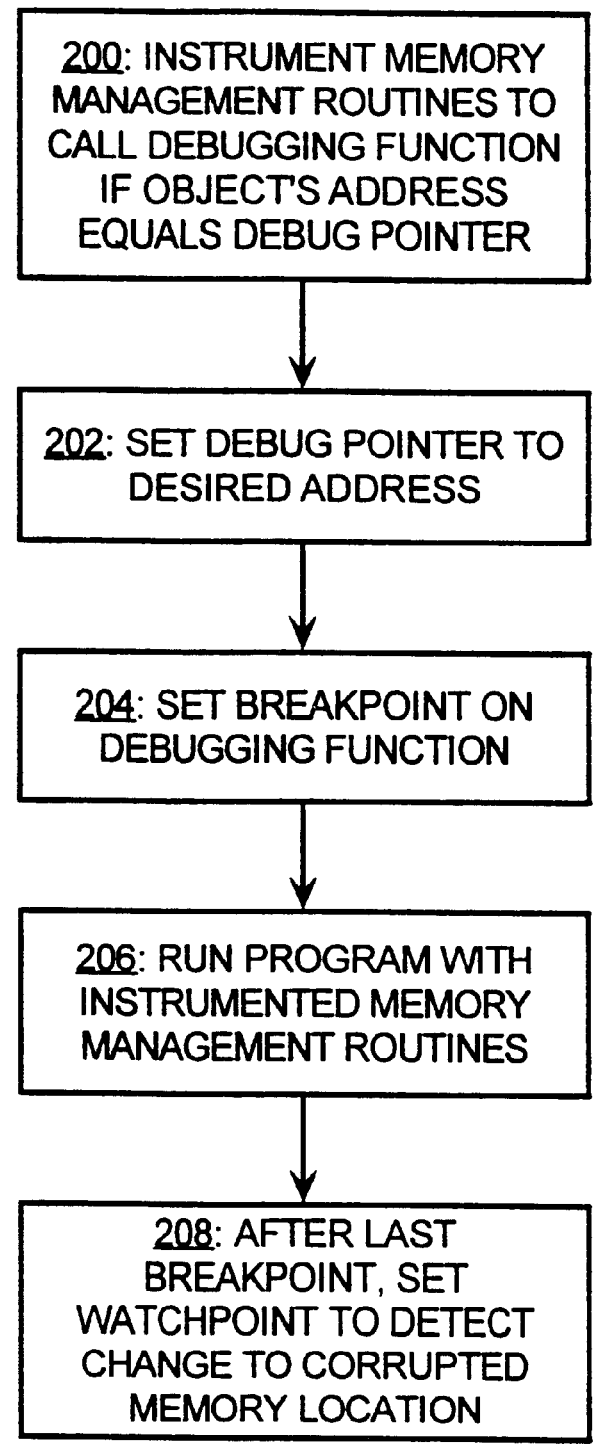
FIG. 2 is a flow diagram of diagnosing a program for debugging memory corruption in accordance with one embodiment of the present invention.

FIG. 2 is a flow diagram of diagnosing a program for debugging memory corruption in accordance with one embodiment of the present invention. At block 200, memory management routines are instrumented to call a debugging function if the address of the object being handled equals the value of a global debug pointer. For example, if a memory allocation routine is responsible for obtaining a specified number of bytes of memory, then the memory allocation routine would check if the address of the allocated memory is equal to the value of the global debug pointer. If equal, the memory allocation routine would then call a debugging function.

The debugging function need not do anything at all and can be a stub function that merely returns back to the calling function as long as the debugging function allows for a breakpoint to be set in the debugger. In some embodiments, however, the debugging function can also output useful information, such as the address, type, and value of the object to the screen or to a log file. In addition, a separate debugging routine may be provided for each of the memory management routines.

Preferably, the instrumented code is conditionally compiled into the program. Thus, the development version of the program would include the instrumented code, but the production version of the program need not include the instrumented code. Because the overhead of the instrumented is relatively light, it may be acceptable in some instances to have the production version of the program include the instrumented code. Various conditional compilation techniques may be used, for example, by conditionally defining macros that expand to the instrumentation code in debugging version but expand to nothing in the production version.

When the instrumented code have been compiled into memory management or other library routines of the program under a debugging switch, the programmer is now ready to diagnose the cause of the memory corruption. Preferably, the following steps are performed within a symbolic debugger such as sdb (a standard UNIX™ debugger) or gdb (a freeware debugger), but some of the steps may optionally be performed by hard coding some additional code into the program and recompiling.

At block 202, the global debug pointer is set to a desired address. The desired address in the case of debugging a memory corruption is usually the address of the object whose memory was corrupted. For example, if the "right subtree" pointer of a binary tree node is being corrupted, then the desired address would be the address of the binary tree node, not the address of the "right subtree" pointer. This step may be performed within the debugger or by hard coding an assignment to the global debug pointer.

At block 204, a breakpoint is then set on the function that the instrumented memory management routines are programmed to call when the object being handled is located at the address indicated by the global debug pointer. After the breakpoint is set, then the program is run within the debugger in block 206 until the breakpoint is encountered. When the breakpoint is triggered (e.g. when a memory management routine handles an object with the address set in the global debug pointer), the debugger breaks execution of the problem, allowing the programmer to issue debugging commands to inspect memory locations and continue the program's running from the breakpoint. For example, when the memory allocation routine allocates memory for an object that starts with the address set in the global debug pointer, then the debugging routine would be called, triggering the breakpoint and suspending execution of the program within the debugger.

Typically, many objects may be allocated and deallocated over the spot of the object that eventually was corrupted. The breakpoint would be encountered many times. Generally, the last time that the breakpoint is encountered before the manifestation of the memory corruption occurs is the most useful, because much of the previous breakpoints were triggered for objects that no longer exist. (For example, two objects do not share the same memory.)

At block 208, e.g. after the last breakpoint is triggered, a watchpoint is set to detect changes to the memory location that is being corrupted. Alternatively, the memory location can be manually inspected by single stepping through the program. After setting the watchpoint, execution of the program is continued until the watchpoint is triggered, which occurs upon a change to the corrupted memory location, thereby breaking execution of the program. At each of the breaks in execution due to encountering the watchpoints, the programmer can use the debugger to inspect the program and data in search of the cause of the memory corruption. If the programmer does indeed concluded that the latest watchpoint detected the actual corruption, rather than an intended use of the memory location, then the programmer can tell from the current program counter in the debugger which statement caused the corruption.

Unlike the conventional use of a watchpoint at the beginning of the program, which laboriously inspects the specified memory location over thousands if not millions of instructions, the watchpoint in accordance with the disclosed techniques is set well into the execution of the program. As a result, the source of a memory corruption can be identified in minutes rather than in hours or even days.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method for debugging a memory corruption in a program, comprising the steps of:

executing an instrumented version of the program, said instrumented version of the program having a memory management routine programmed to perform the steps of:

comparing an address of an object handled by the memory management routine and a value of a predetermined pointer; and if the address of the object equals the value of the predetermined pointer, then calling a debugging function;

setting the predetermined pointer to a desired value; and setting a breakpoint on the debugging function.

2. The method according to claim 1, further comprising the step of breaking execution of the instrumented version of the program when the debugging function is called having a breakpoint set thereon.

3. The method according to claim 2, further comprising the steps of, after said breaking execution of the instrumented version:

setting a watchpoint on a memory location of the object;

continuing execution of the instrumented version of the program; and breaking execution of the instrumented version of the program when data at the memory location changes.

4. The method according to claim 1, wherein the step of calling the debugging function includes the step of outputting information about the object.

5. The method according to claim 1, wherein the memory management routine is one of an allocation routine and a deallocation routine.

6. A computer-readable medium bearing instructions for debugging a memory corruption in a program, said instructions being arranged to cause one or more processors upon execution thereof to perform the steps of:

executing an instrumented version of the program, said instrumented version of the program having a memory management routine programmed to perform the steps of:

comparing an address of an object handled by the memory management routine and a value of a predetermined pointer; and if the address of the object equals the value of the predetermined pointer, then calling a debugging function;

setting the predetermined pointer to a desired value; and setting a breakpoint on the debugging function.

7. The computer-readable medium according to claim 6, further bearing instructions for performing the step of breaking execution of the instrumented version of the program when the debugging function is called having a breakpoint set thereon.

8. The computer-readable medium according to claim 7, further bearing instructions for performing the steps of, after said breaking execution of the instrumented version:

setting a watchpoint on a memory location of the object;

continuing execution of the instrumented version of the program; and breaking execution of the instrumented version of the program when data at the memory location changes.

9. The computer-readable medium according to claim 6, wherein the step of calling the debugging function includes the step of outputting information about the object.

10. The computer-readable medium according to claim 6, wherein the memory management routine is one of an allocation routine and a deallocation routine.

* * * * *